United States Patent
Wang (10) Patent No.: US 10,827,051 B2
(45) Date of Patent: Nov. 3, 2020

(54) PACKAGING METHOD, PACKAGING APPARATUS, AND TERMINAL

(71) Applicant: HUAWEI TECHNOLOGIES CO., LTD., Shenzhen (CN)

(72) Inventor: Hongxing Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/331,835

(22) PCT Filed: Sep. 9, 2016

(86) PCT No.: PCT/CN2016/098602
§ 371 (c)(1),
(2) Date: Mar. 8, 2019

(87) PCT Pub. No.: WO2018/045570
PCT Pub. Date: Mar. 15, 2018

(65) Prior Publication Data
US 2019/0379772 A1    Dec. 12, 2019

(51) Int. Cl.
*H04M 1/00* (2006.01)
*H04M 1/02* (2006.01)

(52) U.S. Cl.
CPC ....... *H04M 1/0266* (2013.01); *H04M 1/0249* (2013.01)

(58) Field of Classification Search
CPC ...... H05K 1/117; H05K 3/284; H05K 1/0271; H05K 2201/0311; H04M 1/0249; H04M 1/0266
See application file for complete search history.

(56) References Cited

U.S. PATENT DOCUMENTS

| | | | |
|---|---|---|---|
| 7,589,962 B1 * | 9/2009 | Bhatia | F28D 15/0233 165/104.19 |
| 8,213,168 B2 | 7/2012 | McClure et al. | |
| 10,192,785 B2 * | 1/2019 | Liu | H01L 21/32051 |
| 2011/0100234 A1 | 5/2011 | Chang et al. | |
| 2012/0118628 A1 | 5/2012 | Pakula et al. | |
| 2015/0076722 A1 | 3/2015 | Chiang et al. | |

(Continued)

FOREIGN PATENT DOCUMENTS

| CN | 202189342 U | 4/2012 |
|---|---|---|
| CN | 202261446 U | 5/2012 |
| CN | 202415434 U | 9/2012 |

(Continued)

*Primary Examiner* — Nhan T Le
(74) *Attorney, Agent, or Firm* — Kilpatrick Townsend & Stockton LLP (57) ABSTRACT

Embodiments of the present invention relate to the communications field, and provide a packaging method, a packaging apparatus, and a terminal, so as to improve evenness of an adhesive layer and reduce an adhesive overflow probability, thereby improving packaging efficiency and a defect-free rate of terminals. The method includes: forming an adhesive layer on a packaging surface of a packaging module, where a shape and a size of the adhesive layer adapt to the packaging surface; and fastening, into a terminal housing, the packaging module on which the adhesive layer is formed, so that the adhesive layer is filled between the packaging surface and a side wall of the housing.

15 Claims, 4 Drawing Sheets

---

Form an adhesive layer on a packaging surface of a packaging module, where a shape and a size of the adhesive layer adapt to the packaging surface — 101

Fasten, into a terminal housing, the packaging module on which the adhesive layer is formed — 102

(56) References Cited

U.S. PATENT DOCUMENTS

2017/0088749 A1    3/2017  Tsuchida

FOREIGN PATENT DOCUMENTS

| CN | 103533794 A | 1/2014 |
| CN | 104601762 A | 5/2015 |
| CN | 105208150 A | 12/2015 |
| JP | 2002151856 A | 5/2002 |
| JP | 2011095695 A | 5/2011 |
| JP | 2013115615 A | 6/2013 |
| JP | 2014507010 A | 3/2014 |
| JP | 2014119656 A | 6/2014 |
| JP | 2015064431 A | 4/2015 |
| KR | 20130113155 A | 10/2013 |
| WO | 2015170678 A1 | 11/2015 |

* cited by examiner

PACKAGING METHOD, PACKAGING APPARATUS, AND TERMINAL

CROSS-REFERENCE TO RELATED APPLICATIONS

This application is a National Stage of International Application No. PCT/CN2016/098602, filed on Sep. 9, 2016, which is hereby incorporated by reference in its entirety.

TECHNICAL FIELD

Embodiments of the present invention relate to the communications field, and in particular, to a packaging method, a packaging apparatus, and a terminal.

BACKGROUND

Figure 1:
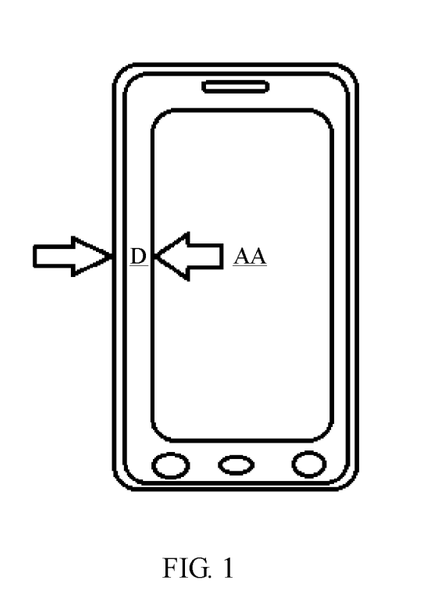
FIG. 1 is a schematic diagram of a narrow-frame mobile phone in the prior art.
Figure 2:
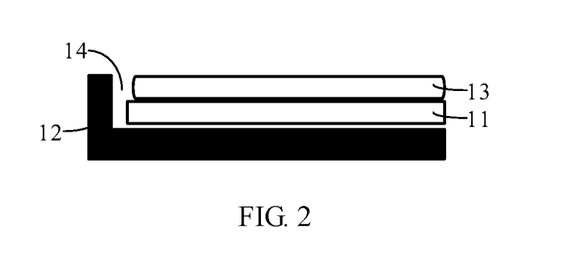
FIG. 2 is a schematic structural diagram of a side cross-section of a narrow-frame mobile phone in the prior art.

As shown in FIG. 1, a narrow-frame mobile phone is usually a mobile phone that has a relatively small spacing D between an effective display area AA of a display panel and a frame of a mobile phone body. As shown in FIG. 2, FIG. 2 is a schematic structural diagram of a side cross-section of a current narrow-frame mobile phone. A display module 11 (the display module 11 may have a touch function) and a cover glass 13 (Cover Glass, CG) are disposed in a housing 12 of the mobile phone. During packaging, the display module 11 and the cover glass 13 are first placed in the housing 12 of the mobile phone for alignment, so that a gap 14 is reserved between an inner surface of the housing 12 and the display module 11 and between the inner surface of the housing 12 and the cover glass 13. Then, the gap 14 is filled with sealant, so that the housing 12 and the display module 11 are sealed to form a mobile phone module.

However, a current sealant filling technology is immature. For example, hot glue is used as sealant. During filling, hot glue that is melted at a high temperature needs to be sprayed into the gap 14. When a spraying direction or an amount of hot glue is inaccurate, an adhesive layer filled in the gap 14 may be not flat or even enough, or hot glue overflows or is sprayed onto a surface of the mobile phone module. In this case, the packaged mobile phone module needs to be polished manually or by using a polishing device. This not only reduces packaging efficiency but also may cause damage to components in the mobile phone module, reducing a defect-free rate of mobile phone modules.

SUMMARY

Embodiments of the present invention provide a packaging method, a packaging apparatus, and a terminal, so as to improve evenness of an adhesive layer and reduce an adhesive overflow probability, thereby improving packaging efficiency and a defect-free rate of terminals.

To achieve the foregoing objective, the embodiments of the present invention use the following technical solutions.

According to a first aspect, an embodiment of the present invention provides a packaging method, including: forming an adhesive layer on a packaging surface of a packaging module, where a shape and a size of the adhesive layer adapt to the packaging surface; and fastening, into a terminal housing, the packaging module on which the adhesive layer is formed, where the adhesive layer is filled between the packaging surface and a side wall of the housing. In this way, compared with filling sealant into a relatively small gap in the prior art, before the packaging module is mounted into the housing, directly forming the adhesive layer on the packaging surface can more accurately control the size and the shape of the adhesive layer, so that the adhesive layer is more even and adhesive overflow is avoided, thereby improving packaging efficiency and a defect-free rate of terminals.

In a possible design, the forming an adhesive layer on a packaging surface of a packaging module includes: coating a substrate membrane with sealant; pressing the sealant-coated side of the substrate membrane onto the packaging surface, so that the sealant is attached onto the packaging surface; and removing the substrate membrane to form the adhesive layer. In this way, the sealant is attached onto the packaging surface of the packaging module by transferring sealant, so as to form the adhesive layer. This evens the adhesive layer better.

In a possible design, the pressing the sealant-coated side of the substrate membrane onto the packaging surface includes: adjusting a relative position between the substrate membrane and the packaging surface, so that a vertical projection of the sealant on the packaging surface coincides with the packaging surface; and moving the substrate membrane onto the packaging surface and applying pressure on the substrate membrane.

In a possible design, the removing the substrate membrane includes: tearing off the substrate membrane before the sealant is fully cured. It is not easy to separate the sealant from the substrate membrane after the sealant is fully cured. Therefore, the substrate membrane may be directly torn off before the sealant is fully cured, so as to simplify a substrate membrane removing process.

In a possible design, after the removing the substrate membrane, the method further includes: polishing the adhesive layer, so that a shape and a size of a surface, in contact with the packaging surface, of the adhesive layer are the same as the shape and the size of the packaging surface. In the foregoing polishing process, the packaging module has not yet been mounted into the terminal housing, and therefore polishing is not restricted by a housing position, thereby reducing complexity and duration of polishing.

In a possible design, the fastening, into a terminal housing, the packaging module on which the adhesive layer is formed includes: attaching a double-sided tape to a bottom surface of the packaging module on which the adhesive layer is formed; and fastening the packaging module into the housing by using the double-sided tape.

In a possible design, the fastening, into a terminal housing, the packaging module on which the adhesive layer is formed includes: mounting, into the housing, the packaging module on which the adhesive layer is formed; heating the adhesive layer, so that the adhesive layer becomes sticky again; and fastening the packaging module into the housing by using the adhesive layer.

In a possible design, the packaging module includes a cover glass and a display module that are disposed opposite, and the cover glass and a surface, perpendicular to a display surface, of the display module form the packaging surface.

According to a second aspect, an embodiment of the present invention provides a terminal, including a housing and a packaging module disposed in the housing, where the housing and the packaging module are packaged together by using the foregoing packaging method.

According to a third aspect, an embodiment of the present invention provides a packaging apparatus, including a control module, and an adsorption fixture and a fastening module that are both connected to the control module, where the control module is configured to control the adsorption fixture, so that an adhesive layer is formed on a packaging surface of a packaging module, where a shape and a size of the adhesive layer adapt to the packaging surface; and control the fastening module to fasten, into a terminal housing, the packaging module on which the adhesive layer is formed, so that the adhesive layer is filled between the packaging surface and a side wall of the housing.

In a possible design, the control module is specifically configured to coat a substrate membrane with sealant; control the adsorption fixture to press the sealant-coated side of the substrate membrane onto the packaging surface, so that the sealant is attached onto the packaging surface; and remove the substrate membrane to form the adhesive layer.

In a possible design, the control module is specifically configured to control the adsorption fixture to adjust a relative position between the substrate membrane and the packaging surface, so that a vertical projection of the sealant on the packaging surface coincides with the packaging surface; and control the adsorption fixture to move the substrate membrane onto the packaging surface and apply pressure on the substrate membrane.

In a possible design, the control module is specifically configured to attach a double-sided tape to a bottom surface of the packaging module, and control the fastening module to fasten the packaging module into the housing by using the double-sided tape.

In a possible design, the control module is specifically configured to: control the fastening module to mount the packaging module into the housing; and after the adhesive layer is heated, and becomes sticky again, fasten the packaging module into the housing by using the adhesive layer.

In the embodiments of the present invention, names of the foregoing packaging apparatus, the terminal, and the packaging module do not constitute a limitation on devices or function modules. In actual implementation, these devices or function modules may appear in other names. Any device or function module whose function is similar to that in the present invention falls within the scope defined by the claims of the present invention and their equivalent technologies.

In addition, for a technical effect brought by any design manner in the second and third aspects, reference may be made to technical effects brought by different design manners in the first aspect. Details are not described again herein.

These or other aspects of the present invention are more concise and comprehensible in descriptions of the following embodiments.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the present invention, unless otherwise indicated, the meaning of "a plurality of" is two or more.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiments of the present invention provide a packaging method, which may be applied to various types of terminals, such as a mobile phone, a tablet computer, a notebook computer, a UMPC (Ultra-mobile Personal Computer, ultra-mobile personal computer), a notebook, a PDA (Personal Digital Assistant, personal digital assistant), and another terminal device, particularly applicable to a process of packaging a narrow-frame terminal.

The narrow-frame terminal is used as an example. In an existing process of packaging the narrow-frame terminal, usually, a to-be-packaged packaging module, such as a display module, a cover glass, and another component, is mounted into a terminal housing first, with a gap being reserved between the housing and the packaging module. Then, hot glue is filled into the gap in a spraying manner, so that the packaging module is fastened in the housing, and the packaging module is protected.

Figure 3:
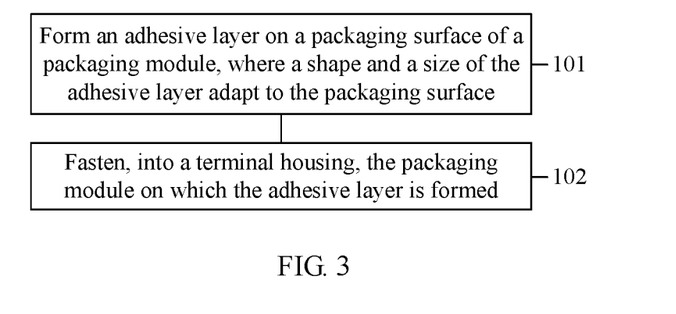
FIG. 3 is a schematic flowchart of a packaging method according to an embodiment of the present invention.

However, the reserved gap is relatively narrow, and it is very difficult to fill the gap evenly with the hot glue by using the foregoing packaging method, and adhesive overflow is likely to occur. Therefore, an embodiment of the present invention provides a packaging method, as shown in FIG. 3, including:

101: Form an adhesive layer on a packaging surface of a packaging module, where a shape and a size of the adhesive layer adapt to the packaging surface.

The packaging module is one or more components that need to be packaged into the terminal housing. Usually, the packaging module may include a cover glass (Cover Glass, CG) and a display module that are disposed opposite. The cover glass may be a transparent protection substrate or a TP (TouchPanel, touch panel) that is integrated with a touch function, and this is not limited in this embodiment of the present invention. The display module may be an LCD (Liquid Crystal Display, liquid crystal display) or a touch display that is integrated with a touch function, and this is not limited in this embodiment of the present invention.

It should be noted that a person skilled in the art may dispose the components in the packaging module based on actual experience. For example, the packaging module may further include an LCD protective frame, where the LCD protective frame may be configured to fasten and protect the cover glass and the display module. This is not limited in this embodiment of the present invention.

Further, the packaging surface of the packaging module is a surface, of the packaging module, that needs to be packaged with the housing. Usually, the packaging surface is a side face of the packaging module in the terminal. For example, the packaging surface may be four surfaces perpendicular to the display surface, of the display module.

Figure 4:
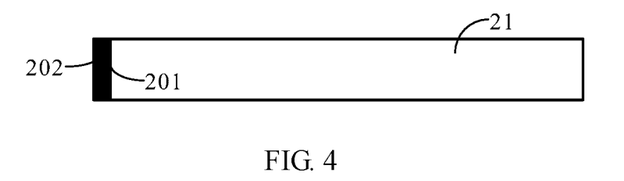
FIG. 4 is a schematic principle diagram 1 of a packaging method according to an embodiment of the present invention.

In step 101, as shown in FIG. 4, the adhesive layer 202 that adapts to a shape and a size of the packaging surface 201 may be formed on the packaging surface 201 of the packaging module 21 before the packaging module 21 is mounted into the housing. Compared with filling sealant into a relatively small gap in the prior art, directly forming the adhesive layer 202 on the packaging surface 201 can more accurately control the size and the shape of the adhesive layer 202, so that the adhesive layer 202 is more even and adhesive overflow is avoided, thereby improving packaging efficiency and a defect-free rate of terminals.

For example, a size and a shape of a surface in contact with the packaging surface 201, of the adhesive layer 202 may be the same as the shape and the size of the packaging surface 201, or a size of a surface in contact with the packaging surface 201, of the adhesive layer 202 may be less than the size of the packaging surface 201. When the size of the surface in contact with the packaging surface 201, of the adhesive layer 202 is less than the size of the packaging surface 201, the shape of the surface in contact with the packaging surface 201, of the adhesive layer 202 may be the same as or different from the shape of the packaging surface 201. This is not limited in this embodiment of the present invention.

Specifically, the method for forming the adhesive layer 202 on the packaging surface 201 of the packaging module 21 is not limited in this embodiment of the present invention. A person skilled in the art may perform an operation based on actual experience. For example, the following provides a method of forming the adhesive layer 202 by attaching sealant to the packaging surface 201 of the packaging module 21 by transferring sealant, specifically including the following steps 301 to 303.

301: Coat a substrate membrane with sealant.

Figure 5:
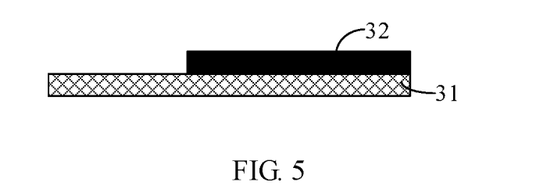
FIG. 5 is a schematic principle diagram 2 of a packaging method according to an embodiment of the present invention.

Specifically, as shown in FIG. 5, the substrate membrane 31 may be coated with a particular thickness of the sealant 32 by using an adhesive dispensing technology. In this case, a shape and size of the sealant 32 may be controlled based on the shape and the size of the packaging surface 201.

The sealant in this embodiment of the present invention may be any adhesive substance, such as hot glue. This is not limited in this embodiment of the present invention.

In addition, the substrate membrane 31 may be made up of any material that does not have a chemical reaction with the sealant 32. For example, the substrate membrane 31 may be a PET (Polyethylene terephthalate, polyethylene terephthalate) membrane.

302: Press the sealant-coated side of the substrate membrane onto a packaging surface, so that the sealant is attached onto the packaging surface.

Figure 6:
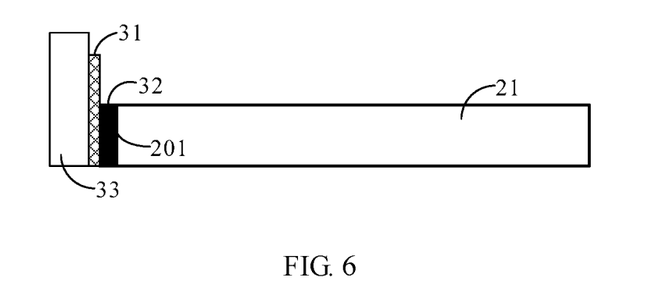
FIG. 6 is a schematic principle diagram 3 of a packaging method according to an embodiment of the present invention.
Figure 7:
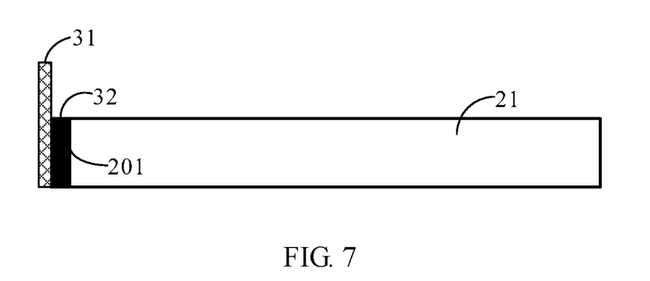
FIG. 7 is a schematic principle diagram 4 of a packaging method according to an embodiment of the present invention.

Specifically, in step 302, first, a relative position between the substrate membrane 31 and the packaging surface 201 may be adjusted, so that a vertical projection of the sealant 32 on the packaging surface 201 coincides with the packaging surface 201. For example, an adsorption fixture may be used to adsorb one side of the substrate membrane 31 that is not coated with the sealant 32, and then the adsorption fixture aligns with the packaging surface 201 by adjusting a position of the adsorption fixture. As shown in FIG. 6, when the vertical projection of the sealant 32 on the packaging surface 201 coincides with the packaging surface 201, the adsorption fixture 33 moves the substrate membrane 31 to the packaging surface 201 and applies pressure on the substrate membrane 31, so that the sealant 32 on the substrate membrane 31 is attached onto the packaging surface 201. In this case, after the adsorption fixture 33 is removed, as shown in FIG. 7, the substrate membrane 31 and the sealant 32 are both attached onto the packaging surface 201.

Figure 8:
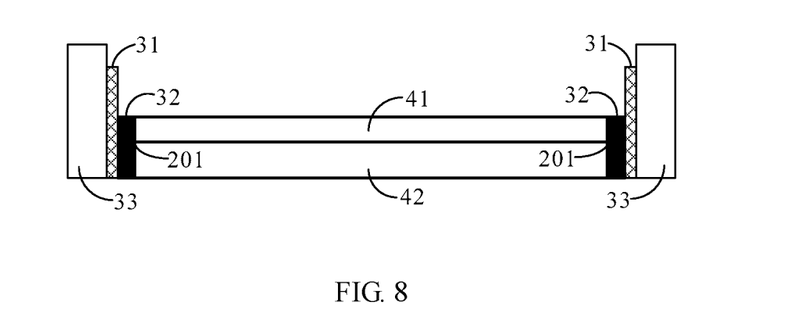
FIG. 8 is a schematic principle diagram 5 of a packaging method according to an embodiment of the present invention.

In addition, the packaging module 21 may have a plurality of the packaging surfaces 201, as shown in FIG. 8. For example, the packaging module 21 includes a cover glass 41 and a display module 42 that are disposed opposite. In this case, two side faces that function as side edges of the terminal are both packaging surfaces, and the two substrate membranes 31 may be coated separately with the sealant 32. Then, in step 302, as shown in FIG. 8, the sealant 32-coated sides of the two substrate membranes 31 may be simultaneously pressed onto the two packaging surfaces 201 by using the adsorption fixture 33. In this way, a regular adhesive layer can be formed on the two packaging surfaces, and the cover glass 41 and the display module 42 can be aligned at the adhesive layer, thereby reducing a step between the cover glass 41 and the display module 42.

Certainly, a size of the entire packaging module 21 in a direction perpendicular to the packaging surface 201 may be controlled by adjusting a thickness of the sealant 32, so as to improve dimensional precision of the terminal.

303: Remove the substrate membrane to form an adhesive layer.

In step 303, after the substrate membrane 31 in FIG. 7 is removed, the adhesive layer 202 shown in FIG. 4 is formed on the packaging surface 201.

Specifically, the sealant 32 is not easily separated from the substrate membrane 31 after the sealant 32 is fully cured, and therefore the substrate membrane 31 can be directly torn off before the sealant 32 is fully cured.

In addition, the sealant 32 may deform when the sealant 32 is pressed onto the packaging surface 201 in step 302. In this case, for the adhesive layer 202 obtained after the substrate membrane 31 is removed, a size and a shape of a surface in contact with the packaging surface 201, of the adhesive layer 202 may be a little different from the size and the shape of the packaging surface 201, and the adhesive layer 202 may be higher than the packaging module. Therefore, the adhesive layer 202 may be polished, so that the shape and the size of the surface in contact with the packaging surface 201, of the adhesive layer 202 is the same as the shape and the size of the packaging surface 201, and a height of the adhesive layer 202 does not exceed that of the packaging module.

It may be understood that, in the foregoing polishing process, the packaging module 21 has not yet been mounted into the terminal housing, and therefore, polishing is not restricted by a housing position, thereby reducing complexity and duration of polishing.

Hereto, by performing steps 301 to 303, the adhesive layer 202 can be attached to the packaging surface 201 of the packaging module 21 by transferring sealant, so as to form the adhesive layer 202 on the packaging surface 201.

102: Fasten, into the terminal housing, the packaging module on which the adhesive layer is formed.

Figure 9:
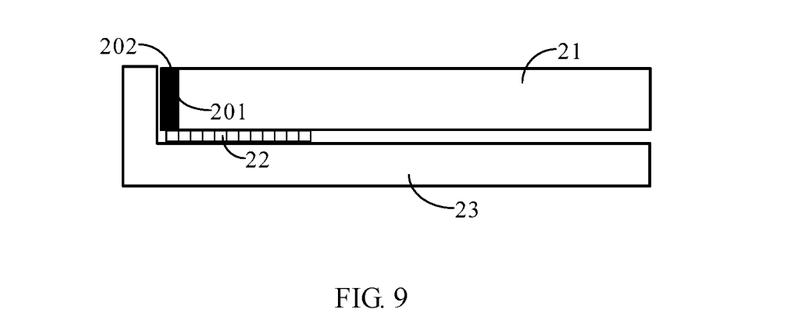
FIG. 9 is a schematic principle diagram 6 of a packaging method according to an embodiment of the present invention.

Specifically, in step 102, as shown in FIG. 9, a double-sided tape 22, such as a foam adhesive, may be attached onto a bottom surface of the packaging module 21. Then, the packaging module 21 is fastened into the housing 23 by using the double-sided tape 22. In this case, the adhesive layer 202 is filled between a side wall of the housing 23 and the packaging module 21, so that the housing 23 and the packaging module 21 are closely joined, achieving a function of protecting the packaging module 21.

Figure 10:
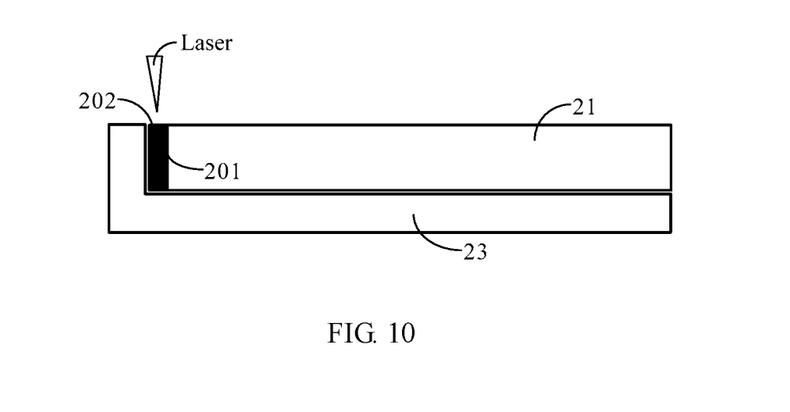
FIG. 10 is a schematic principle diagram 7 of a packaging method according to an embodiment of the present invention.

Alternatively, as shown in FIG. 10, the packaging module 21 may be first mounted into the housing 23, so that the adhesive layer 202 is filled between the packaging surface 201 and the side wall of the housing 23. In this case, the adhesive layer 202 is heated. For example, the adhesive layer 202 is scanned by using a laser to make the adhesive layer 202 become sticky again. In this way, the packaging module 21 and the housing 23 can be stuck together by using the adhesive layer 202, so that the packaging module 21 is fastened into the housing 23.

Hereto, this embodiment of the present invention provides the packaging method. First, the adhesive layer is formed on the packaging surface of the packaging module, where the shape and the size of the surface, in contact with the packaging surface, of the adhesive layer may be the same as the shape and the size of the packaging surface. Then, the packaging module on which the adhesive layer is formed is fastened into the terminal housing. In this way, compared with filling sealant into a relatively small gap in the prior art, directly forming the adhesive layer on the packaging surface can more accurately control the size and the shape of the adhesive layer, so that the adhesive layer is more even and adhesive overflow is avoided, thereby improving packaging efficiency and a defect-free rate of terminals.

Further, an embodiment of the present invention provides a terminal, including a housing and a packaging module disposed in the housing. For a process of packaging the housing and the packaging module, refer to detailed descriptions in the foregoing embodiment.

Further, an embodiment of the present invention provides a packaging apparatus. Based on the foregoing packaging method, the packaging apparatus may be divided into function modules. For example, each function module may have one function, or two or more functions may be integrated into one processing module. The integrated module may be implemented in a form of hardware, or may be implemented in a form of a software function module. It should be noted that the module division in this embodiment of the present invention is used as an example, and is merely logical function division. There may be other division in actual implementation.

Figure 11:
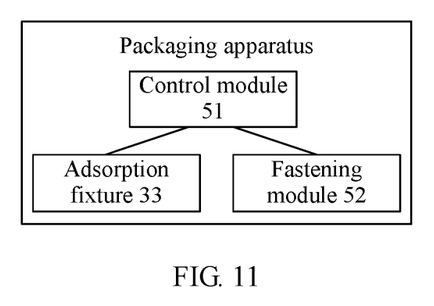
FIG. 11 is a schematic structural diagram of a packaging apparatus according to an embodiment of the present invention.

If an integrated unit is applied, FIG. 11 shows a possible schematic structural diagram of a packaging apparatus related to the foregoing embodiment. The packaging apparatus includes a control module 51, and an adsorption fixture 33 and a fastening module 52 that are both connected to the control module 51. The control module 51 is configured to control and manage actions of the packaging apparatus. For example, the control module 51 is configured to control the adsorption fixture 33 to perform step 101 in FIG. 3, and the control module 51 is further configured to control the fastening module 52 to perform step 102 in FIG. 3 and/or configured to perform another process of the technology described in this specification. For all function descriptions of corresponding function modules, refer to related content of the steps about the foregoing method embodiment. Details are not described herein again.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A packaging method, comprising:
    forming an adhesive layer on a packaging surface of a packaging module, wherein a shape and a size of the adhesive layer adapt to the packaging surface; and
    fastening, into a terminal housing, the packaging module on which the adhesive layer is formed, so that the adhesive layer is filled between the packaging surface and a side wall of the housing.

2. The method according to claim 1, wherein the forming an adhesive layer on a packaging surface of a packaging module comprises:
    coating a substrate membrane with sealant;
    pressing the sealant-coated side of the substrate membrane onto the packaging surface, so that the sealant is attached onto the packaging surface; and
    removing the substrate membrane to form the adhesive layer.

3. The method according to claim 2, wherein the pressing the sealant-coated side of the substrate membrane onto the packaging surface comprises:
    adjusting a relative position between the substrate membrane and the packaging surface, so that a vertical projection of the sealant on the packaging surface coincides with the packaging surface; and
    moving the substrate membrane onto the packaging surface and applying pressure on the substrate membrane.

4. The method of claim 3, after the removing the substrate membrane, further comprising:
   polishing the adhesive layer, so that a shape and a size of a surface, in contact with the packaging surface, of the adhesive layer are the same as the shape and the size of the packaging surface.

5. The method of claim 3, wherein the fastening, into a terminal housing, the packaging module on which the adhesive layer is formed comprises:
   mounting, into the housing, the packaging module on which the adhesive layer is formed;
   heating the adhesive layer, so that the adhesive layer becomes sticky again; and
   fastening the packaging module into the housing by using the adhesive layer.

6. The method according to claim 2, wherein the removing the substrate membrane comprises:
   tearing off the substrate membrane before the sealant is fully cured.

7. The method of claim 6, after the removing the substrate membrane, further comprising:
   polishing the adhesive layer, so that a shape and a size of a surface, in contact with the packaging surface, of the adhesive layer are the same as the shape and the size of the packaging surface.

8. The method of claim 6, wherein the fastening, into a terminal housing, the packaging module on which the adhesive layer is formed comprises:
   mounting, into the housing, the packaging module on which the adhesive layer is formed;
   heating the adhesive layer, so that the adhesive layer becomes sticky again; and
   fastening the packaging module into the housing by using the adhesive layer.

9. The method of claim 2, after the removing the substrate membrane, further comprising:
   polishing the adhesive layer, so that a shape and a size of a surface, in contact with the packaging surface, of the adhesive layer are the same as the shape and the size of the packaging surface.

10. The method of claim 9, wherein the fastening, into a terminal housing, the packaging module on which the adhesive layer is formed comprises:
    mounting, into the housing, the packaging module on which the adhesive layer is formed;
    heating the adhesive layer, so that the adhesive layer becomes sticky again; and
    fastening the packaging module into the housing by using the adhesive layer.

11. The method of claim 2, wherein the fastening, into a terminal housing, the packaging module on which the adhesive layer is formed comprises:
    mounting, into the housing, the packaging module on which the adhesive layer is formed;
    heating the adhesive layer, so that the adhesive layer becomes sticky again; and
    fastening the packaging module into the housing by using the adhesive layer.

12. The method of claim 1, wherein the fastening, into a terminal housing, the packaging module on which the adhesive layer is formed comprises:
    attaching a double-sided tape to a bottom surface of the packaging module on which the adhesive layer is formed; and
    fastening the packaging module into the housing by using the double-sided tape.

13. The method of claim 1, wherein the fastening, into a terminal housing, the packaging module on which the adhesive layer is formed comprises:
    mounting, into the housing, the packaging module on which the adhesive layer is formed;
    heating the adhesive layer, so that the adhesive layer becomes sticky again; and
    fastening the packaging module into the housing by using the adhesive layer.

14. The method of claim 1, wherein the packaging module comprises a cover glass CG and a display module that are disposed opposite, and the CG and a surface, perpendicular to a display surface, of the display module form the packaging surface.

15. A terminal, comprising a housing and a packaging module disposed in the housing, wherein the housing and the packaging module are packaged together by using the packaging method of claim 1.

* * * * *